United States Patent [19]

Grebner et al.

[11] E Re. 30,273

[45] Reissued May 13, 1980

[54] ROCKER SWITCH WITH INTEGRAL OFF LOCK

[75] Inventors: Stuart W. Grebner, Euclid, Ohio; James V. Johnson, Jr.; Leonardus J. Josemans, both of Smithfield, N.C.

[73] Assignee: Eaton Corporation, Cleveland, Ohio

[21] Appl. No.: 883,352

[22] Filed: Mar. 3, 1978

Related U.S. Patent Documents

Reissue of:

[64] Patent No.: 4,013,858
Issued: Mar. 22, 1977
Appl. No.: 592,411
Filed: Jul. 2, 1975

[51] Int. Cl.[2] ..... H01H 9/28

[52] U.S. Cl. ..... 200/42 T; 200/321; 200/339

[58] Field of Search ..... 200/42 R, 42 T, 44, 200/321, 322, 324, 325, 67 G, 68, 339; 70/203

[56] References Cited

U.S. PATENT DOCUMENTS

| | | | |
|---|---|---|---|
| 2,616,012 | 10/1952 | Gaynor | 200/322 |
| 3,906,176 | 9/1975 | Carlson | 200/42 T |

FOREIGN PATENT DOCUMENTS

| | | | |
|---|---|---|---|
| 1076787 | 3/1960 | Fed. Rep. of Germany | 200/42 T |
| 1907855 | 5/1970 | Fed. Rep. of Germany | 200/42 R |
| 1947014 | 3/1971 | Fed. Rep. of Germany | 200/321 |

*Primary Examiner*—Stephen Marcus
*Attorney, Agent, or Firm*—Hugh R. Rather; William A. Autio

[57] ABSTRACT

A rocker switch having a spring-biased lock lever within the contact actuator that extends out to catch beneath the rim of the hole in the frame to lock the rocker button in the "off" position. An insertable key, which may include the entire face of the rocker button, has a projecting cam effective when inserted to retract the lock lever to allow normal operation. Removal of the key prevents unlocking of the rocker switch for operation to "on" position. The lock lever has an angular end that allows actuation of the rocker button from "on" to "off" position even when the key is removed. This angular end cams on the frame to momentarily depress the lock lever and allow it to snap below the rim of the hole in the frame. This lock lever is then inaccessible except to the projecting cam of the key.

14 Claims, 8 Drawing Figures

ROCKER SWITCH WITH INTEGRAL OFF LOCK

Matter enclosed in heavy brackets [ ] appears in the original patent but forms no part of this reissue specification; matter printed in italics indicates the additions made by reissue.

BACKGROUND OF THE INVENTION

Integral and non-integral off locks for electric switches have been known heretofore. In one form, a trigger switch is provided with a spring-biased latch lever carried by the trigger that locks onto a small round hole in the switch frame whenever the trigger returns to "off" position. And a release button must be pressed to release this lever to allow the trigger to be operated. In another known form of the non-integral type, a trigger, a spring-biased latch and a removable release key are separately mounted in the tool handle. This spring-biased latch moves into the path of the trigger to prevent operation thereof, and the key must be depressed to pivot this latch out of the path of trigger travel to allow operation thereof. This key can be removed to lock the switch "off". In still another known form, a rocker switch is provided with an integral off lock such that removal of a key from a hole in the rocker decouples the rocker button for lost motion movement relative to the contact actuator to prevent switch operation. Insertion of the key couples the rocker to contact actuator to afford normal switch "on" operation. One-way interference between the rocker and contact actuator affords actuation of the switch "off" even when the key is out.

While these prior off lock designs have been useful for their intended purposes, they nevertheless have had certain disadvantages. For example, the first mentioned form is not readily adaptable for use in rocker switches. The second mentioned form is not self-contained and thus requires that individual parts must be mounted in the tool handle. The third mentioned form can be rather easily defeated when the key is removed by inserting a stiff wire into the hole in the rocker and pressing the contact actuator to its "on" position.

Accordingly, it has been found desirable to provide a rocker switch with integral off lock that overcomes disadvantages of the aforementioned type.

SUMMARY OF THE INVENTION

This invention relates to rocker switches and more particularly to rocker switches with integral off lock.

An object of the invention is to provide an improved rocker switch.

A more specific object of the invention is to provide a rocker switch with an improved slidable off lock.

Another specific object of the invention is to provide a rocker switch with an improved off lock that is self-contained in that the slidable lock lever is carried by the contact actuator.

Another specific object of the invention is to provide a rocker switch with an improved off lock including a spring-biased lock lever that is longitudinally reciprocal.

Another specific object of the invention is to provide an improved rocker switch with an integral off lock having a minimum number of parts that are easily assembled.

Another object of the invention is to provide a rocker switch with an improved off lock having a removable rocker button key and a lock lever that is inaccessible to anything other than such key and that is not easily defeated when the key is removed.

Other objects and advantages of the invention will hereinafter appear.

DESCRIPTION OF THE PREFERRED EMBODIMENTS

Figure 1:
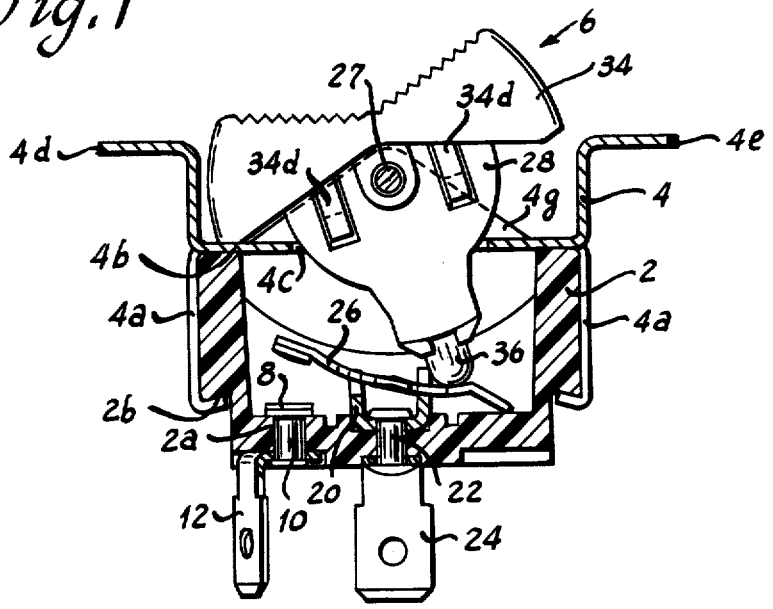
FIG. 1 is an enlarged cross-sectional view of a doublepole rocker switch with integral off lock showing the rocker button key snap-on legs in elevation.

Referring to FIG. 1, there is shown a rocker switch with integral off lock constructed in accordance with the invention. As shown generally therein, the rocker switch is provided with a housing comprising an insulating base 2 and a metal frame 4. This base is a generally rectangular cup closed at the top by the frame which pivotally supports a rocker assembly 6 hereinafter described. The frame could be molded insulating material.

Base 2 is provided with means for supporting stationary and movable contacts. For this purpose, the flat bottom of the base is provided with a plurality of round holes 2a, for example, four holes for the double-pole single-throw switch illustrated, through which rivets extend to connect internal stationary contacts to external terminals. As shown in FIG. 1 there is a left end contact 8 connected by a rivet 10 to an external terminal 12. And there is a central stationary contact 20 connected by a rivet 22 to an external terminal 24. Left end stationary contact 8 is in the form of a flat coined element similar to a rivet head whereas central stationary contact 20 is in the form of a stationary cradle for rockably supporting a two-position movable bridging contact 26 in a manner well known in the art. A similar set of contacts is provided for the other pole of the switch.

Frame 4 has a plurality of depending legs 4a that embrace the ends of the base and their lower ends are bent inwardly into undercut notches 2b to secure the frame to the base. Frame 4 has a flat upper surface 4b overlying the base with a generally rectangular hole 4c centrally therein through which rocker assembly 6 extends into the base for actuation of the contacts. Frame 4 additionally has left and right upwardly and outwardly turned arms 4d and 4e, respectively, as shown in FIG. 1, each having a threaded hole or other suitable means for mounting the switch to a mounting panel. Furthermore, frame 4 has rocker assembly supporting means including a pair of spaced, upstanding, generally triangular, bent-up portions 4f and 4g having aligned holes therethrough for a pivot pin 27 that supports the rocker assembly as shown in FIGS. 1-3 and 5.

Figure 6:
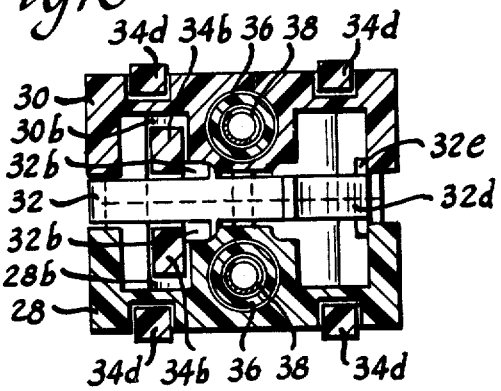
FIG. 6 is a horizontal cross-sectional view taken along line 6—6 of FIG. 2 to show the lock lever in top view.
Figure 7:
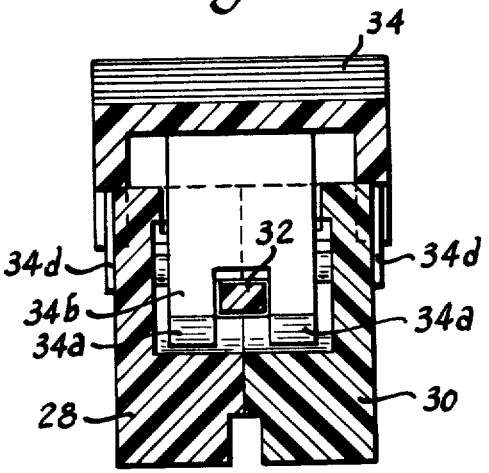
FIG. 7 is a lateral cross-sectional view taken along line 7—7 of FIG. 2 to show the lock release projection of the rocker button key.
Figure 8:
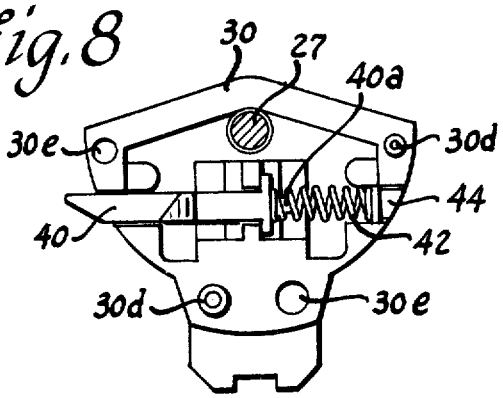
FIG. 8 is an internal view of one of the contact actuator halves showing an alternative form of off lock lever.

Rocker assembly 6 consists of five parts in the version shown in FIGS. 1-7 and five parts in the version shown in FIG. 8. Thus, in the first mentioned version, this rocker assembly consists of two like contact actuator halves 28 and 30 of molded insulating material, a lock lever 32 confined therebetween for limited movement, and a snap-on rocker button 34 that also serves as the key for releasing the off lock. Alternatively, the off lock release key may be of any other shape or may form only a small part of the rocker button face.

Figure 5:
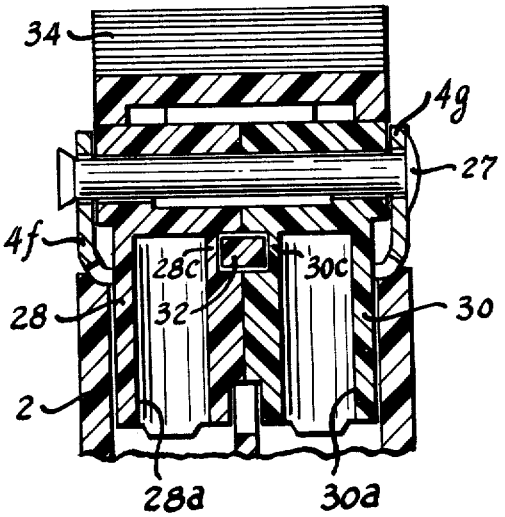
FIG. 5 is a lateral cross-sectional view taken through the center of the rocker button and contact actuator of FIG. 2 to show internal details.

These contact actuator halves are provided with means for operating the respective movable contacts such as contact 26. For this purpose, each contact actuator half is provided with a bore 28a, 30a shown in FIG. 5 extending up from its lower, reduced end portion for retaining a spring biased plunger 36 as shown in FIGS. 1 and 6 which plunger slides along and rockably actuates the respective on-off movable contact when the rocker assembly is actuated. Springs 38 bias these plungers downwardly.

Figure 2:
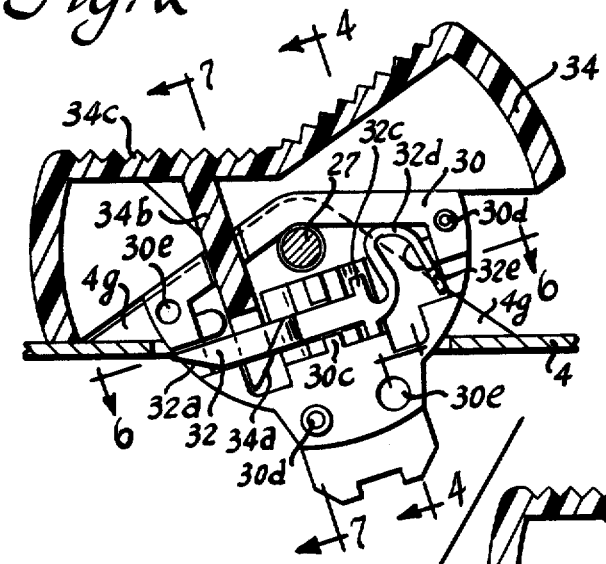
FIG. 2 is a further enlarged cross-sectional view of the rocker button showing the off lock lever in its retracted position.
Figure 3:
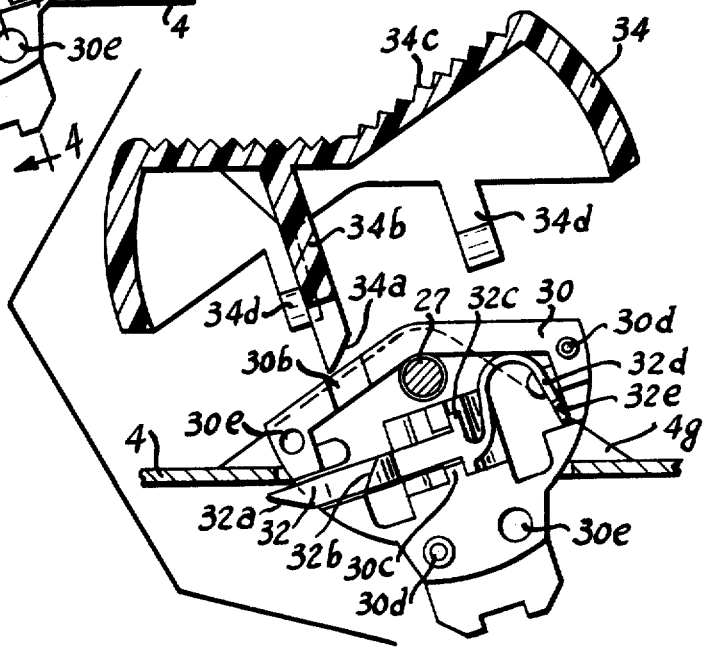
FIG. 3 is an exploded cross-sectional view like FIG. 2 but showing the rocker button key separated from the contact actuator and showing the off lock lever in its extended position.
Figure 4:
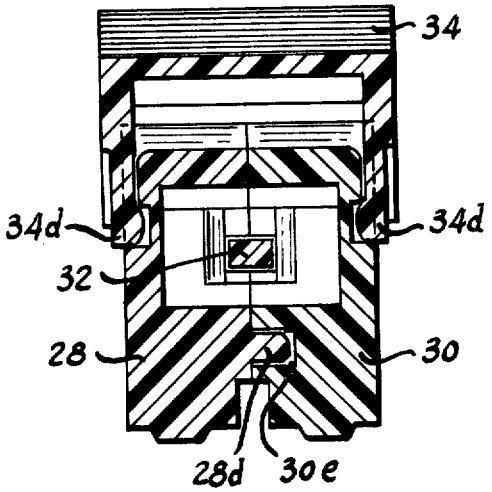
FIG. 4 is a lateral cross-sectional view taken along line 4—4 of FIG. 2 to show the interfitting elements of the parts.

These contact actuator halves are also provided therebetween with a guiding slot allowing limited reciprocal movement of the lock lever and the latter is provided with a suitable configuration to cooperate therewith. For this purpose, as shown in FIGS. 2 and 3, molded insulating lock lever 32 is provided at its left end with angular cam surface 32a which cams itself momentarily in to snap below the housing when the contact actuator assembly is pivoted counter-clockwise while the rocker button key is removed as in FIG. 3. The lock lever is also provided with a pair of lateral wings 32b having cam surfaces thereon for engagement by complementary cam surfaces 34a on projections 34b of the rocker button key 34. These wings are suitably spaced from upper and lower stop projections 32c on this lock lever so that they are positioned within slots 28b, 30b in the contact actuator halves that receive projections 34b of the button key. As shown in FIGS. 3 and 5, the guiding slot for the lock lever is provided with a constriction 28c, 30c forming a stop for upper and lower projections 32c of the lock lever to limit the leftward movement of the latter. The right end of the lock lever is provided with a thin section 32d that is bent double in the cavity within the contact actuator halves to serve as a compression spring biasing the lock lever into its leftward extended position in FIG. 3. Thus, there is provided an integral bias spring molded in one piece with the lock lever of plastic material such as "Celcon M90" or "Zytel" or the like. The extreme end 32e of this spring 32d is T-shaped for good abutting engagement with the righthand wall of the cavity, as shown in FIGS. 4 and 6, spanning the hole thereat provided by the symmetrical contact actuator halves. The movement of this lock lever is limited in its leftward extended direction by projections 32c abutting constriction walls 28c, 30c. The movement of this lock lever is limited in its rightward retracted direction by integral spring 32d which keeps it from going further than it is forced by cams 34a and projections 34b of the rocker button key.

These two contact actuator halves 28 and 30 are kept in registration with one another by a plurality of suitable projections 28d and 30d fitting snugly into complementary recesses such as 30e in the opposite half, as shown in FIGS. 2-4. With such interfitting engagement, the two contact actuator halves are then held snugly between upstanding portions 4f and 4g of the frame with headed pivot pin 27 passing therethrough and flared at its other end to support the same for pivotal movement.

Rocker button 34 serves not only as the manually engagable part for actuating the switch but also as the removable key leaving the switch locked in its off position. For this purpose, this rocker button key is provided with the aforementioned projection 34b having cam 34a at its divided end for withdrawing the lock lever into the contact actuator when this key is snapped in place. This rocker button key is also provided with the usual finger engaging portion including a laterally V-grooved shallow V-shaped upper surface 34c facilitating rocking thereof by pressing on the high end. In addition, this rocker button key is provided with snap-on means coupling it removably on the pair of contact actuator halves. This means comprises two pairs of inwardly detented resilient legs 34d shown most clearly in FIGS. 1, 3, 4 and 6. The two legs of the first pair thereof are symmetrically spaced on the front of contact actuator 28 and the two legs of the other pair thereof are symmetrically spaced on the back of contact actuator 30. The front and rear walls of the contact actuators are provided with complementary grooves having deeper portions at their lower ends for the detents on legs 34d thereby to afford snap-on retention of the rocker button key on the contact actuators as well as snap-out removal when desired. While a V-shaped rocker surface is shown, other finger-engaging shapes such as a paddle or the like are possible.

As shown in FIGS. 6 and 7, projection 34b of the rocker button key is bifurcated at its lower end so that its two cams 34a engage wings 32b equally and smoothly retract the lock lever within the contact actuator when the rocker button key is snapped in place. While two cams on each of the key and lock lever are shown, it will be apparent that one or more may be used.

The modification in FIG. 8 differs only in the spring for the lock lever. Thus, a modified lock lever 40 is provided that differs from that hereinbefore described in that thin section spring 32d has been omitted and only a short stud 40a left in place of it to serve as a retainer for one end of a separate helical compression spring 42 confined between the righthand end of the lock lever and a plug 44 that closes the hole in the wall of the cavity within the contact actuator halves. This spring is in compression to bias lock lever 40 to its extended position as shown in FIG. 8. Upon insertion of the rocker button key, the lock lever is cammed longitudinally to its retracted position against the force of compression spring 42. Alternatively, the hole in the wall could be molded closed to avoid the necessity of plug 44.

While the apparatus hereinbefore described is effectively adapted to fulfill the objects stated, it is to be understood that the invention is not intended to be confined to the particular preferred embodiments of rocker switch with integral off lock disclosed, inasmuch as they are susceptible of various modifications without departing from the scope of the appended claims.

We claim:

1. A self-enclosed rocker switch comprising:

an insulating housing *having a hole in the top thereof;* stationary contact means within said housing connected to external terminals;

movable contact means within said housing selectively operable to an "on" position closing a circuit with respect to said stationary contact means or to an "off" position opening said circuit;

a rocker assembly;

supporting means on said housing pivotally mounting said rocker assembly for rocking movement to actuate said movable contact means;

and said rocker assembly comprising:

contact actuator means extending *through said hole* into said housing for actuating said movable contact means to said "on" and "off" position;

a spring-biased locking member having a locking position and an unlocking position and projecting from said contact actuator means in its said locking position to catch on *the rim of said hole in* said housing thereby to prevent pivotal movement of said rocker assembly;

and a removable rocker button having high end portions with a valley therebetween and means for coupling the same to said contact actuator means so that selective depression of one of said high end portions effects pivotal movement of said rocker button and said contact actuator means coupled thereto and means on said rocker button operable when inserted into said contact actuator means together with said coupling thereof for moving said locking member against the force of its bias spring into said unlocking position clear *said rim of said hole* of said housing to afford normal pivotal movement of said rocker assembly.

2. The self-enclosed rocker switch defined in claim 1, wherein:

said means for moving said locking member comprises a projecting cam on said rocker button insertable into said contact actuator means;

and said locking member comprises a complementary cam engageable by said projecting cam to retract said locking member within said contact actuator means and clear of said *rim of said hole in said* housing and to maintain said locking member retracted while said rocker button is coupled to said contact actuator means.

3. [The] *A* self-enclosed rocker switch [defined in claim 2, wherein] *comprising:*

*an insulating housing;*

*stationary contact means within said housing connected to external terminals;*

*movable contact means within said housing selectively operable to an "on" position closing a circuit with respect to said stationary contact means or to an "off" position opening said circuit;*

*a rocker assembly;*

*supporting means on said housing pivotally mounting said rocker assembly for rocking movement to actuate said movable contact means;*

*and said rocker assembly comprising:*

*contact actuator means extending into said housing for actuating said movable contact means to said "on" or "off" position;*

*a spring-biased locking member having a locking position and a unlocking position and projecting from said contact actuator means in its said locking position to catch on said housing thereby to prevent pivotal movement of said rocker assembly;*

*and a removable rocker button having high end portions with a valley therebetween and means for coupling the same to said contact actuator means so that selective depression of one of said high end portions effects pivotal movement of said rocker button and said contact actuator means coupled thereto and means on said rocker button operable when inserted into said contact actuator means together with said coupling thereof for moving said locking member against the force of its bias spring into said unlocking position clear of said housing to afford normal pivotal movement of said rocker assembly;*

*and* said rocker button and said contact actuator means [comprise] *comprising* a snap-on connection *providing said coupling means* for retaining said rocker button on said contact actuator means to afford normal operation and for providing ready removability of said rocker button to prevent operation of said contact actuator means.

4. A self-enclosed rocker switch with an integral off lock and insertable rocker button key affording operation thereof but preventing operation thereof upon removal of the key comprising:

a switch housing;

stationary contact means within said housing connected to external terminal means;

movable contact means within said housing having on and off positions respectively engaged with and disengaged from said stationary contact means;

an aperture in said housing;

supporting means adjacent opposite sides of said aperture for pivotally mounting a rocker means for limiting reciprocal movement;

and said rocker means comprising:

a contact actuator extending through said aperture into said housing for actuating said movable contact means between said on and off positions when said rocker means is operated;

a spring-biased locking member having one end extending from said contact actuator to automatically catch on said housing thereby to prevent operation of said rocker means;

said contact actuator comprising a pair of interfitting members clamped together by said pivotal supporting means and having a cavity therebetween for guiding said spring-biased locking member for limited movement between said extended and said retracted positions;

and a removable rocker button insertable into said contact actuator to cause retraction of said locking member thereby to allow normal on-off operation of said rocker means;

said removable rocker button comprising a projection extending into said contact actuator, the end of said projection having an angular surface for camming said spring-biased locking member into its retracted position upon insertion of said projection into said contact actuator, and the top of said rocker button having high end portions separated by a valley and means for removably connecting the same to said contact actuator so that selective depression of one of said high end portions effects pivotal movement of said contact actuator.

5. The rocker switch defined in claim 4, wherein:

said spring-biased locking member comprises an angular cam surface on its extended end for engaging said housing to cause momentary [reaction] *retraction* thereof to allow operation of said rocker means from said on to off position even though said key has been removed.

6. A self-enclosed rocker switch with an integral off lock and insertable key affording operation thereof but preventing operation thereof upon removal of the key comprising:

an insulating housing;

stationary contact means within said housing connected to external terminal means;

movable contact means within said housing having on and off positions respectively engaged with and disengaged from said stationary contact means;

an aperture in said housing;

supporting means adjacent said aperture for pivotally mounting a rocker means for limited reciprocal movement;

and said rocker means comprising:

contact actuator means extending through said aperture into said housing for actuating said movable contact means between said on and off positions when said rocker means is operated;

a spring-biased locking member extending from said contact actuator means to catch on said housing thereby to prevent operation of said rocker means;

and a removable key insertable into said rocker means to cause retraction of said locking member thereby to allow normal on-off operation of said rocker means;

said contact actuator means comprising a pair of interfitting members clamped together by said pivotal supporting means and having a cavity therebetween for guiding said spring-biased locking member for limited movement between its extended and retracted positions;

and said spring-biased locking member comprising an elongated member mounted for limited longitudinal movement in said cavity of said contact actuator means between extended and retracted positions and a thin strip molded integrally on one end of said elongated member and bent double within said cavity to provide the spring bias therefor.

7. The rocker switch defined to claim 4, wherein:

said spring-biased locking member comprises a helical compression spring between the other end of said elongated member and a wall of said cavity.

8. The rocker switch defined in claim 4, wherein:

said rocker button and said contact actuator comprise snap-in means for coupling them together.

9. The rocker switch defined in claim 4 wherein:

said removable rocker button projection comprises a bifurcated projection extending into said contact actuator means, and the ends of said bifurcations are provided with cam surfaces:

and said spring-biased locking member is provided with a pair of wings having cam surfaces engaged by the respective cam surfaces of said bifurcated projection to cause retraction of said locking member.

10. The rocker switch defined in claim 4, wherein:

said [contact] cavity in said contact actuator interfitting members [clamped together by said pivotal supporting means and having] *comprises* a symmetrical cavity therebetween including a constriction wall for guiding said spring-biased locking member for movement between its extended and retracted positions;

and a lateral projection on said locking member forming a stop against said constriction wall to limit the extended movement thereof.

11. The rocker switch defined in claim 4, wherein:

said switch housing comprises a base having an opening and a cover closing said opening and having said aperture therein;

said contact actuator comprises an arcuate periphery that rotates past an edge of said aperture in said cover;

and said spring-biased locking member extends out through a point in said arcuate rotatable periphery of said contact actuator that traverses the rim of said aperture thereby to catch beneath said rim when the switch is in its off position and said rocker button is removed.

*12. A self-enclosed pivoted-actuator switch comprising:*

*an insulating housing;*

*stationary contact means within said housing connected to external terminals;*

*movable contact means within said housing selectively operable to an "on" position closing a circuit with respect to said stationary contact means or to an "off" position opening said circuit;*

*an actuator assembly;*

*supporting means on said housing pivotally mounting said actuator assembly for reciprocal movement to actuate said movable contact means;*

*and said actuator assembly comprising:*

*contact actuator means extending from said pivotal supporting means into said housing for actuating said movable contact means to said "on" or "off" position;*

*a spring-biased locking member having a locking position and an unlocking position and projecting from said contact actuator means in its said locking position to catch on said housing thereby to prevent pivotal movement of said actuator assembly;*

*a removable operating member having a manually-engageable portion and means for coupling the same to said contact actuator means so that selective actuation thereof by said manually-engageable portion effects pivotal movement of both said removable operating member and said contact actuator means coupled thereto and means on said removable operating member which when inserted into said contact actuator means together with said coupling thereof moves said locking member against the force of its bias spring into said unlocking position clear of said housing to afford normal pivotal movement of said actuator assembly;*

*and said means for coupling said operating member to said contact actuator means comprises snap-on connection means for normally retaining said operating member on and firmly secured to said contact actuator means during actuation thereof to afford normal operation and for providing ready pull-off removability of said operating member to prevent unauthorized operation of said switch.*

*13. The self-enclosed pivoted-actuator switch claimed in claim 12, wherein:*

*said removable operating member covers said contact actuator means when it is coupled thereto.*

*14. The self-enclosed pivoted-actuator switch claimed in claim 12, wherein:*

*said means on said removable operating member is effective following insertion thereof into said contact actuator means for maintaining said locking member in its unlocking position until said removable operating member is again removed.*

* * * * *